(12) United States Patent
He et al.

(10) Patent No.: US 12,264,255 B2
(45) Date of Patent: Apr. 1, 2025

(54) WATER-BASED COIL COATING WITHOUT AMINE NEUTRALIZATION

(71) Applicants: Yufeng He, Wuxi (CN); Qishan Han, Wuxi (CN)

(72) Inventors: Yufeng He, Wuxi (CN); Qishan Han, Wuxi (CN)

( * ) Notice: Subject to any disclaimer, the term of this patent is extended or adjusted under 35 U.S.C. 154(b) by 0 days.

(21) Appl. No.: 18/822,809

(22) Filed: Sep. 3, 2024

(65) Prior Publication Data

US 2025/0075097 A1 Mar. 6, 2025

(30) Foreign Application Priority Data

Sep. 6, 2023 (CN) .......................... 202311139831.2

(51) Int. Cl.
| | | |
|---|---|---|
| *C09D 7/00* | (2018.01) | |
| *C08K 5/3492* | (2006.01) | |
| *C09D 7/20* | (2018.01) | |
| *C09D 7/61* | (2018.01) | |
| *C09D 7/63* | (2018.01) | |
| *C09D 7/65* | (2018.01) | |
| *C09D 167/02* | (2006.01) | |

(52) U.S. Cl.
CPC ...... *C09D 167/025* (2013.01); *C08K 5/34922* (2013.01); *C09D 7/20* (2018.01); *C09D 7/61* (2018.01); *C09D 7/63* (2018.01); *C09D 7/65* (2018.01)

(58) Field of Classification Search
CPC ........ C09D 167/025; C09D 7/65; C09D 7/61; C09D 7/20; C09D 7/63; C08K 5/34922
USPC ....................................................... 106/218
See application file for complete search history.

(56) References Cited

FOREIGN PATENT DOCUMENTS

| CN | 101157818 A | * | 4/2008 |
|---|---|---|---|
| CN | 101550311 A | * | 10/2009 |
| CN | 101157818 B | * | 12/2010 |
| CN | 101550311 B | * | 7/2011 |

OTHER PUBLICATIONS

CNIPA, Notification of Second Office Action for CN202311139831.2, Nov. 7, 2023.
Replacement claims (allowed) of CN202311139831.2, Nov. 22, 2023.
CNIPA, Notification to grant patent right for invention in CN202311139831.2, Nov. 26, 2023.

* cited by examiner

*Primary Examiner* — James E McDonough
(74) *Attorney, Agent, or Firm* — Hemisphere Law, PLLC; Zhigang Ma

(57) ABSTRACT

A water-based coil coating without amine neutralization includes the following components in percent by weight: an amine-free waterborne resin: 88-93%, a crosslinking resin: 4-9%, a first auxiliary: 0.5%, a second auxiliary: 0.5%, a third auxiliary: 2.0%, and a diluent. A solid content in the water-based coil coating is greater than 40%. A solid content ratio of the amine-free waterborne resin to the crosslinking resin is in a range of 4-9. The water-based coil coating does not include amine neutralizing agents, not only possesses performance equivalent to or even exceeding that of oil-based coatings, but also greatly reduces VOC emissions, allowing for direct exhaust of tail gases. Wastewater treatment is extremely simple, and there is no pollution from ammonia nitrogen and nitrogen oxides. Downstream coating enterprises have a very high acceptance of the water-based coil coating without the amine neutralization.

6 Claims, No Drawings

WATER-BASED COIL COATING WITHOUT AMINE NEUTRALIZATION

CROSS-REFERENCE TO RELATED APPLICATION

This application claims priority to Chinese Patent Application No. 202311139831.2, filed Sep. 6, 2023, which is herein incorporated by reference in its entirety.

TECHNICAL FIELD

The disclosure relates to the field of coil coatings, and more particularly to a water-based coil coating that does not require amine neutralization.

BACKGROUND

Coil coatings are specialized coatings used to coat surfaces of steel plates and aluminum plates to make pre-coated coils for use. Currently, the coil coatings mainly are oil-based, and no mature water-based coatings are applied in the coil industry.

Although oil-based coil coatings can meet customer requirements in various aspects, the oil-based coil coatings are targets for replacement in the "oil-to-water" transition of coatings due to their serious excess of content of volatile organic compounds (VOCs).

Water-based coil coatings with amine neutralization have raised significant concerns at downstream application end due to the presence of amine neutralizing agents (also referred to as amine neutralizer). During a baking process, when the amine neutralizing agents and moisture volatilize together, severe electrochemical corrosion can occur on inner walls of metal baking tunnels, significantly increasing operational costs. In terms of performance, light-colored coatings tend to yellow during a baking and curing process; bright colors easily lose their original hues during storage, with color differences becoming unacceptable to customers; the coating gloss is relatively low and does not meet customers' requirements for high gloss; water immersion performance cannot be passed; and the cured coating film is prone to softening, etc. These drawbacks make downstream coating manufacturers hesitant to try using the water-based coil coatings with the amine neutralization. Additionally, the volatilization of the amine neutralizing agents can lead to excessive emissions of nitrogen oxides into the atmosphere, and when entering water bodies, the nitrogen oxides can cause ammonia nitrogen pollution, resulting in black and smelly water. Furthermore, formulations of the water-based coil coatings with the amine neutralization include antibacterial and antifungal agents, resulting in a greater burden on downstream wastewater treatment, as these agents directly lead to the killing of bacteria introduced in a wastewater treatment process.

Therefore, the "oil-to-water" transition, i.e., transitioning from oil-based coatings to water-based coatings, is an inevitable and urgent trend. However, current water-based coil coatings with the amine neutralization cannot meet various performance requirements of the application end for various reasons. In research, it is found that the water-based coil coatings without the amine neutralization are highly accepted by application end-users and are an undisputed choice. Currently, it is conservatively estimated that the annual production of the coil coatings has exceeded 1 million tons per year. Therefore, whether it is the VOC emission pollution from the oil-based coatings or the amine substance pollution from the water-based coatings with the amine neutralization, for a base of 1 million tons of coatings, the environmental impact would be unbearable. The management of ammonia nitrogen water pollution is a global challenge.

A Chinese patent with publication No. CN101157818A provides a water-based coating for steel strips, and a formulation of the water-based coating for the steel strips contains an epoxy modified polyester resin that requires an addition of an organotin catalyst during preparation. The organotin catalyst can cause long-term cumulative toxicity to construction workers, and the use of organotin can severely restrict the export of the pre-coatinged coils and their products. On May 28, 2009, the European Union passed Regulation 2009/425/EC, which further restricts the use of organotin compounds in all consumer products.

SUMMARY

A purpose of the disclosure is to overcome shortcomings in the related art and to provide a water-based coil coating without amine neutralization. The water-based coil coating does not include amine neutralizing agents. The water-based coil coating not only possesses performance equivalent to or even exceeding that of oil-based coatings, but also greatly reduces VOC emissions, allowing for direct exhaust of tail gases. Wastewater treatment is extremely simple, and there is no pollution from ammonia nitrogen and nitrogen oxides. Downstream coating enterprises have a very high acceptance of the water-based coil coating without the amine neutralization.

In order to achieve above purposes, the disclosure adopts the following technical solutions.

In a first aspect, an embodiment of the disclosure provides a water-based coil coating without amine neutralization, the water-based coil coating includes the following components in percent by weight:
 an amine-free waterborne resin: 88-93%;
 a crosslinking resin: 4-9%;
 a first auxiliary: 0.5%;
 a second auxiliary: 0.5%;
 a third auxiliary: 2.0%; and
 a diluent.

A solid content in the water-based coil coating is greater than 40%, a solid content ratio of the amine-free waterborne resin to the crosslinking resin is in a range of 4-9, the amine-free waterborne resin is HUT® 7450N4 waterborne resin, and the crosslinking resin is CYMEL® 303LF resin. The CYMEL® 303 LF resin is a highly methylated, monomeric melamine crosslinker supplied in liquid form at ≥98% solids content. The HUT® 7450N4 waterborne resin is obtained by the reaction of low-molecular-weight polyester polyol and low-molecular-weight acrylate oligomer containing carboxyl. The polyester polyol includes methylpropanediol ($C_4H_{10}O_2$), hydroxypivalic acid ($C_5H_{10}O_3$), neopentyl glycol monoester, trimellitic anhydride ($C_9H_4O_5$), 1,4-cyclohexanedicarboxylic acid ($C_8H_{12}O_4$), and adipic acid ($C_6H_{10}O_4$). The acrylate oligomer includes methyl methacrylate ($C_5H_8O_2$), methacrylic acid ($C_4H_6O_2$), acrylic acid ($C_3H_4O_2$), and butyl acrylate ($C_7H_{12}O_2$).

In a second aspect, an embodiment of the disclosure provides a water-based coil coating without amine neutralization, the water-based coil coating includes the following components in percent by weight:
 an amine-free waterborne resin: 53-55%;
 a crosslinking resin: 2.5-5.5%;
 a first auxiliary: 0.2%;

a second auxiliary: 0.2%;
a third auxiliary: 1.0%;
NAMEI white paste: 40%; and
a diluent.

A solid content in the water-based coil coating is greater than 50%, a solid content ratio of the amine-free waterborne resin to the crosslinking resin is in a range of 4-9, the amine-free waterborne resin is HUT® 7450N4 waterborne resin, and the crosslinking resin is CYMEL® 303LF resin.

In a third aspect, an embodiment of the disclosure provides a water-based coil coating without amine neutralization, the water-based coil coating includes the following components in percent by weight:

an amine-free waterborne resin: 80-84.2%;
a crosslinking resin: 3.8-8.0%;
a first auxiliary: 0.35%;
a second auxiliary: 0.35%;
a third auxiliary: 1.7%;
NAMEI black paste: 9.6%; and
a diluent.

A solid content in the water-based coil coating is greater than 40%, a solid content ratio of the amine-free waterborne resin to the crosslinking resin is in a range of 4-9, the amine-free waterborne resin is HUT® 7450N4 waterborne resin, and the crosslinking resin is CYMEL® 303LF resin.

In an embodiment, the first auxiliary in the above embodiments includes one selected from the group consisting of an organosilicon wetting agent, a polyacrylate wetting leveling agent and a polyester wetting leveling agent. The second auxiliary in the above embodiments includes an alkynediol wetting agent, and the third auxiliary in the above embodiments includes an epoxy phosphate ester adhesion promoter or a silane coupling agent adhesion promoter.

In an embodiment, the crosslinking resin in the above embodiments uses fully or partially methylated amino resins and blocked isocyanate crosslinkers.

In an embodiment, the diluent in the above embodiments includes one selected from the group consisting of pure water, distilled water and deionized water.

In an embodiment, the water-based coil coatings provided by the above embodiments of the disclosure meet the following conditions: viscosity: 80-120 seconds(s) in a Ford cup #4, the solid content >40 weight percent (wt. %), a plate temperature (PMT): 210-232 degrees Celsius (C), T-bend: 0-2 torque (T), methyl ethyl ketone (MEK) wiping >100 times, gloss at 60 degrees >85%, boiling water resistance >2 hours (h).

The technical solutions provided by the embodiments of the disclosure have the following beneficial effects.

The water-based coil coating without the amine neutralization of the disclosure does not include the amine neutralizing agents. The water-based coil coating not only possesses the performance equivalent to or even exceeding that of the oil-based coatings but also greatly reduces the VOC emissions, allowing for the direct exhaust of the tail gases. The wastewater treatment is extremely simple, and there is no pollution from the ammonia nitrogen and the nitrogen oxides. The downstream coating enterprises have a very high acceptance of the water-based coil coating that does not require the amine neutralization.

The water-based coil coating without the amine neutralization of the disclosure does not use raw materials with heavy metal organic catalysts including organotin. A heavy metal content in the water-based coil coating meets standards of GB4806.10-2016, and the water-based coil coating also complies with standards of US FDA 21 CFR 175.300.

The water-based coil coating without the amine neutralization refers to a category of coatings that do not have any amine neutralizing agents (such as aqueous ammonia, N,N-Dimethyl-3-methoxypropylamine, triethylamine, N,N-dimethyl ethanolamine, 2-methyl-2-amino-1-propanol, 2-dimethylamino-2-methylpropanol, triethanolamine, and monoethanolamine, etc.) added during preparations of waterborne resins and water-based coatings, and an application process by end-users. The preparation and use of the water-based coil coating without the amine neutralization completely avoid the atmosphere pollution by the nitrogen oxides and the water body pollution by the ammonia nitrogen caused by the volatilization of amine substances. Moreover, in the use process of the water-based coil coating without the amine neutralization, there is no electrochemical corrosion to production equipment due to no volatilization of the amine substances, which can greatly extend the service life of the production equipment and reduce operating costs to be close to or even lower than those of using oil-based coatings.

DETAILED DESCRIPTION OF EMBODIMENTS

In order to clarify the purposes, technical solutions, and advantages of the disclosure, further detailed explanations of the disclosure are provided below in conjunction with embodiments. It should be understood that the specific embodiments described herein are only for explaining the disclosure and are not intended to limit the disclosure.

Embodiment 1

A water-based coil coating without amine neutralization does not include amine neutralizing agents. The water-based coil coating includes the following components in percent by weight as shown in Table 1.

TABLE 1 a formula of the water-based coil coating without the amine neutralization in the embodiment 1

| Raw material name | Specification | Weight percent (%) |
|---|---|---|
| HUT®7450N4 waterborne resin | 40 wt. % | 92.76 |
| CYMEL® 303LF resin | 98 wt. % | 4.64 |
| First auxiliary | TEGO® 270 | 0.37 |
| Second auxiliary | DYNOL ™ 604 | 0.37 |
| Third auxiliary | FANGJING 846 (75 wt. %) | 1.86 |
| Diluent | Pure water | A solid content in the water-based coil coating is 43.05 |

A solid content ratio of the HUT® 7450N4 waterborne resin to the CYMEL® 303LF resin is 8:1. The TEGO® 270 is polyether siloxane copolymer. The DYNOL™ 604 is ethoxylated acetylene-based gemini surfactant. The FANGJING 846 is a modified acrylic ester compound.

Embodiment 2

A water-based coil coating without amine neutralization does not include amine neutralizing agents. The water-based coil coating includes the following components in percent by weight as shown in Table 2.

TABLE 2

*a formula of the water-based coil coating in the embodiment 2*

| Raw material name | Specification | Weight percent (%) |
|---|---|---|
| HUT® 7450N4 waterborne resin | 40 wt. % | 91.36 |
| CYMEL® 303LF resin | 98 wt. % | 6.08 |
| First auxiliary | TEGO® 270 | 0.37 |
| Second auxiliary | DYNOL™ 604 | 0.37 |
| Third auxiliary | FANGJING 846 (75 wt. %) | 1.82 |
| Diluent | Pure water | A solid content in the water-based coil coating is 43.86 |

A solid content ratio of the HUT® 7450N4 waterborne resin to the CYMEL® 303LF resin is 6:1.

Embodiment 3

A water-based coil coating without amine neutralization does not include amine neutralizing agents. The water-based coil coating includes the following components in percent by weight as shown in Table 3.

TABLE 3

*a formula of the water-based coil coating in the embodiment 3*

| Raw material name | Specification | Weight percent (%) |
|---|---|---|
| HUT® 7450N4 waterborne resin | 40 wt. % | 54.41 |
| CYMEL® 303LF resin | 98 wt. % | 2.72 |
| First auxiliary | TEGO® 270 | 0.22 |
| Second auxiliary | DYNOL™ 604 | 0.22 |
| Third auxiliary | FANGJING 846 (75 wt. %) | 1.08 |
| NAMEI white paste | 72 wt. % | 41.35 |
| Diluent | Pure water | A solid content in the water-based coil coating is 55.01 |

A solid content ratio of the HUT7450N4 waterborne resin to the CYMEL® 303LF resin is 8:1. The NAMEI white paste is purchased from Zhejiang Namei material technology Co., Ltd, China, with a product name: Shining® white R108H3-NA. The main component of the NAMEI white paste is pigment white 6.

Embodiment 4

A water-based coil coating without amine neutralization does not include amine neutralizing agents. The water-based coil coating includes the following components in percent by weight as shown in Table 4.

TABLE 4

*a formula of the water-based coil coating in the embodiment 4*

| Raw material name | Specification | Weight percent (%) |
|---|---|---|
| HUT® 7450N4 waterborne resin | 40 wt. % | 53.92 |
| CYMEL® 303LF resin | 98 wt. % | 3.59 |
| First auxiliary | TEGO® 270 | 0.22 |
| Second auxiliary | DYNOL™ 604 | 0.21 |
| Third auxiliary | FANGJING 846 (75 wt. %) | 1.08 |

TABLE 4-continued

*a formula of the water-based coil coating in the embodiment 4*

| Raw material name | Specification | Weight percent (%) |
|---|---|---|
| NAMEI white paste | 72 wt. % | 40.98 |
| Diluent | Pure water | A solid content in the water-based coil coating is 55.41 |

A solid content ratio of the HUT® 7450N4 waterborne resin to the CYMEL® 303LF resin is 6:1. The NAMEI white paste is purchased from Zhejiang Namei material technology Co., Ltd, China, with a product name: Shining® white R108H3-NA.

Embodiment 5

A water-based coil coating without amine neutralization does not include amine neutralizing agents. The water-based coil coating includes the following components in percent by weight as shown in Table 5.

TABLE 5

*a formula of the water-based coil coating in the embodiment 5*

| Raw material name | Specification | Weight percent (%) |
|---|---|---|
| HUT® 7450N4 waterborne resin | 40 wt. % | 83.47 |
| CYMEL® 303LF resin | 98 wt. % | 4.17 |
| First auxiliary | TEGO® 270 | 0.33 |
| Second auxiliary | DYNOL™ 604 | 0.33 |
| Third auxiliary | FANGJING 846 (75 wt. %) | 1.67 |
| NAMEI black paste | 30 wt. % | 10.03 |
| Diluent | Pure water | A solid content in the water-based coil coating is 41.74 |

A solid content ratio of the HUT® 7450N4 waterborne resin to the CYMEL® 303LF resin is 8:1. The NAMEI black paste is purchased from Zhejiang Namei material technology Co., Ltd, China, with a product name: Shining® black EW0104 N132304044. The main component of the NAMEI black paste is pigment black 7.

Embodiment 6

A water-based coil coating without amine neutralization does not include amine neutralizing agents. The water-based coil coating includes the following components in percent by weight as shown in Table 6.

TABLE 6

*a formula of the water-based coil coating in the embodiment 6*

| Raw material name | Specification | Weight percent (%) |
|---|---|---|
| HUT® 7450N4 waterborne resin | 40 wt. % | 82.33 |
| CYMEL® 303LF resin | 98 wt. % | 5.48 |
| First auxiliary | TEGO® 270 | 0.33 |
| Second auxiliary | DYNOL™ 604 | 0.33 |
| Third auxiliary | FANGJING 846 (75 wt. %) | 1.65 |

TABLE 6-continued a formula of the water-based coil coating in the embodiment 6

| Raw material name | Specification | Weight percent (%) |
|---|---|---|
| NAMEI black paste | 30 wt. % | 9.88 |
| Viscosity regulator | Pure water | A solid content in the water-based coil coating is 42.50 |

A solid content ratio of the HUT® 7450N4 waterborne resin to the CYMEL® 303LF resin is 6:1. The NAMEI black paste is purchased from Zhejiang Namei material technology Co., Ltd, China, with a product name: Shining® black EW0104 N132304044.

The HUT® 7450N4 waterborne resin in the embodiments 1-6 is an amine-free waterborne resin produced by Jiangsu Sanrong Polymer Co., Ltd, China, which has already been applied in practical applications. It should be understood that other amine-free waterborne resins that meet requirements can also be used in the disclosure. Therefore, the disclosure has sufficiently disclosed relevant information about amine-free waterborne resins.

A preparation method of the water-based coil coating without the amine neutralization in the embodiments 1-6 includes following steps 1-2.

Step 1, required amounts of deionized water, the amine-free waterborne resin, the crosslinking resin, the first auxiliary, the second auxiliary and the third auxiliary are weighed according to the weight ratio, and pigment pastes are selectively weighed as needed to obtain weighed materials.

Step 2, a temperature inside a coating mixing kettle is checked and does not exceed 30° C., With the temperature inside the coating mixing kettle not exceeding 30° C., the weighed amine-free waterborne resin is added to the coating mixing kettle and stirred, with a stirring speed controlled at 1200 revolutions per minute (rpm). Then, the weighed crosslinking resin, the weighed first auxiliary, the weighed second auxiliary, the weighed third auxiliary, and the weighed pigment paste (added selectively as needed) are sequentially added to the coating mixing kettle with an interval between adding each material of 15 minutes (min), followed by stirring thoroughly for 60 min (the material temperature in the coating mixing kettle will rise, but must not exceed 35° C.; if the material temperature exceeds 35° C., the coating mixing kettle is cooled by passing chilled water through a jacket of the coating mixing kettle) to obtain a first product. Deionized water is added to the first product as necessary to adjust viscosity, followed by stirring the first product thoroughly for at least 15 min to adjust the viscosity to 80-120 s (a Ford cup #4) to obtain a second product. After passing the performance inspection, the second product is filtered, weighed, and then packaged to obtain the water-based coil coating without the amine neutralization.

The first auxiliary, the second auxiliary and the third auxiliary are diluted with deionized water to a concentration of 10% before use. The coating mixing kettle includes a dispersion disc therein to disperse materials, and a diameter ratio of the dispersion disc to the coating mixing kettle is 1:2.5.

The water-based coil coating is stored at a temperature under 30° C. If the water-based coil coating is stored at a temperature from minus 10° C. to minus 20° C., coating properties will not change. Before application, it is only necessary to bring the stored coating to room temperature in the construction environment. The storage stability of the water-based coil coating can last for at least 6 months.

Comparative Embodiment 1

An oil-based coil coating, includes the following components in percent by weight: 50% polyester resin YD3215 (effective part: 60 wt. %), 5% fully methylated amino resin (98 wt. %), 0.3% cooling catalyst (NACURE® 5225), 0.6% leveling agent (EFKA® 3777), 2% dispersant (BYK® 104), 25% rutile titanium dioxide, 3% copper phthalocyanine, 4% precipitated silica matting powder, 0.5% polyethylene tetrafluoroethylene wax powder, 9.6% high boiling point solvent (Aromatic solvent 150).

In a preparation of the oil-based coil coating, according to the weight ratio, the polyester resin YD3215 the leveling agent EFKA® 3777 and the dispersant BYK® 104 are added to a dispersion kettle followed by high-speed dispersion to uniformity to obtain a first mixture, the rutile titanium dioxide and the copper phthalocyanine are added to the first mixture and then ground to a fineness less than 15 micrometers (μm) to obtain a second mixture. The precipitated silica matting powder and the polyethylene tetrafluoroethylene wax powder are added to the second mixture and then dispersed at high speed to uniformity to obtain a third mixture, the cooling catalyst 5225 and the fully methylated amino resin 303 are added to the third mixture, along with the high boiling point solvent (Aromatic solvent 150) to adjust viscosity, to obtain the oil-based coil coating.

Comparative Embodiment 2

An amine-neutralized water-based coil coating includes the following components in percent by weight: 50% water-based amine-neutralized polyester emulsion DRL-0818 (45 wt. %), 3.5% fully methylated amino resin (98 wt. %), 0.5% cooling catalyst (NACURE® 5225), 1.5% defoamer SV450, 0.5% leveling agent F608, 0.6% wetting agent (DYNOL™ 604), 2% dispersant (Solsperse™ W100C), 30% rutile titanium dioxide paste (70 wt. %), 6% copper phthalocyanine paste, 1.5% thickener SV1540, 3.2% amine neutralizing agent AMP-95™, 0.3% antibacterial agent Kathon (an abbreviation for isothiazolinone, CAS: 26172-55-4, 2682-20-4) and 0.4% antifungal agent (formaldehyde slow-release agent 1,3-dihydroxymethyl-5,5-dimethylhydantoin).

In a preparation of the amine-neutralized water-based coil coating, according to the weight ratio, the water-based amine-neutralized polyester emulsion DRL-0818 is added into a dispersion kettle, and then the amine neutralizing agent AMP-95™ is added to the dispersion kettle for neutralization to obtain a first mixture. The leveling agent F608, the wetting agent, and the dispersant are added to the first mixture and then dispersed uniformly at high speed to obtain a second mixture. The rutile titanium white paste, the copper phthalocyanine paste, the defoamer SV450, and the thickener SV1540 are added to the second mixture and then dispersed at high speed to a fineness less than 15 μm to obtain a third mixture. The cooling catalyst, the fully methylated amino resin 303, the antibacterial agent, and the antifungal agent are added to the third mixture followed by adjusting viscosity with deionized water to obtain the amine-neutralized water-based coil coating.

TABLE 7 performance comparison of the water-based coil coatings prepared in the embodiments 1-4

| Technical Index | | Embodiment 1 | Embodiment 2 | Embodiment 3 | Embodiment 4 |
|---|---|---|---|---|---|
| Viscosity (Ford cup #4) seconds | 80-120 | 94 | 92 | 86 | 88 |
| Solid content/wt. % | >40 | 43.05 | 43.86 | 55.01 | 55.41 |
| PMT/° C. | 210-232 | 216 | 216 | 216 | 216 |
| T-bend | 0-2 T | 0 T | 0 T | 0 T | 0 T |
| MEK wiping | >100 times | >100 times | >100 times | >100 times | >100 times |
| Gloss at 60 degrees | >85% | 100.8% | 101.3% | 98.5% | 99.2% |
| Boiling water resistance (no change) | >2 h | >2 h | >2 h | >2 h | >2 h |

TABLE 8 performance comparison of coil coatings prepared in the embodiments 5-6 and the comparative embodiments 1-2

| Technical Index | | Embodiment 5 | Embodiment 6 | Comparative embodiment 1 | Comparative embodiment 2 |
|---|---|---|---|---|---|
| Viscosity (Ford cup #4) seconds | 80-120 | 116 | 113 | 115 | 112 |
| Solid content/wt.% | >40 | 41.74 | 42.50 | 67.40 | 50.43 |
| PMT/° C. | 210-232 | 216 | 216 | 232 | 232 |
| T-bend | 0-2 T | 0 T | 0 T | 1 T | 2 T |
| MEK wiping | >100 times | >100 times | >100 times | >100 times | Cannot pass the test |
| Gloss at 60 degrees | >85% | 101.6% | 100.8% | 65% | 65% |
| Boiling water resistance (no change) | >2 h | >2 h | >2 h | >2 h | Cannot pass the test |

The MEK wiping is conducted in accordance with the standard GB/T 23989-2009, the T-bend test is conducted in accordance with the standard GB/T 30791-2014, and the gloss at 60 degrees is measured in accordance with the standard GB/T 9754-2007.

It can be seen, from the Table 7 and the Table 8, that the water-based coil coating without the amine neutralization of the disclosure has a lower curing temperature and is more energy-saving and consumption-reducing. The water-based coil coating without the amine neutralization of the disclosure can withstand boiling water for more than 2 hours without any change in performance. Since application scenarios of pre-coated coils are very complex, and many of the application scenarios are used in high-temperature and high-humidity environments, the ability to withstand boiling water for 2 hours is a mandatory inspection item. For coating manufacturers, the boiling water resistance index is very important as it can improve the chemical resistance of the coating. The water-based coil coating without the amine neutralization of the disclosure does not use raw materials containing heavy metal organic catalysts such as organotin, and the heavy metal content in the water-based coil coating meets the standard of GB4806.10-2016, and the water-based coil coating meets the standard of US FDA 21 CFR 175.300. In summary, the water-based coil coating without the amine neutralization of the disclosure is more in line with demands of end customers for product performance and environmental protection than oil-based coil coatings and amine-neutralized water-based coil coatings, and the water-based coil coating without the amine neutralization of the disclosure can meet corresponding technical indicators.

It should be noted that the specific embodiments listed in the disclosure are only intended to illustrate technical solutions of the disclosure and are not intended to limit it. Although the disclosure has been described in detail with reference to the embodiments, those skill in the art should understand that the technical solutions of the disclosure can be modified or equivalently replaced without departing from the spirit and scope of the technical solution of the disclosure, which should be covered by the claims of the disclosure.

What is claimed is:

1. A water-based coil coating without amine neutralization, wherein the water-based coil coating does not comprise amine neutralizing agents and does not use raw materials with heavy metal organic catalysts comprising organotin, and the water-based coil coating comprises the following components in percent by weight:
   an amine-free waterborne resin: 88-93%;
   a crosslinking resin: 4-9%;
   a first auxiliary: 0.5%;
   a second auxiliary: 0.5%;
   a third auxiliary: 2.0%; and
   a diluent; wherein a solid content in the water-based coil coating is greater than 40%, a solid content ratio of the amine-free waterborne resin to the crosslinking resin is in a range of 4-9, the first auxiliary comprises one selected from the group consisting of an organosilicon wetting agent, a polyacrylate wetting leveling agent and a polyester wetting leveling agent, the second auxiliary comprises an alkynediol wetting agent, the third auxiliary comprises an epoxy phosphate ester adhesion promoter or a silane coupling agent adhesion promoter, and the diluent comprises one selected from the group consisting of pure water, distilled water and deionized water;

wherein the water-based coil coating meets the following conditions: viscosity: 80-120 seconds(s) in a Ford cup #4, the solid content >40 weight percent (wt. %), a plate temperature (PMT): 210-232 degrees Celsius (° C.), T-bend: 0-2 torque (T), methyl ethyl ketone (MEK) wiping >100 times, gloss at 60 degrees >85%, boiling water resistance >2 hours (h).

2. A water-based coil coating without amine neutralization, wherein the water-based coil coating does not comprise amine neutralizing agents and does not use raw materials with heavy metal organic catalysts comprising organotin, and the water-based coil coating comprises the following components in percent by weight:

an amine-free waterborne resin: 53-55%;
a crosslinking resin: 2.5-5.5%;
a first auxiliary: 0.2%;
a second auxiliary: 0.2%;
a third auxiliary: 1.0%;
and
a diluent; wherein a solid content in the water-based coil coating is greater than 50%, a solid content ratio of the amine-free waterborne resin to the crosslinking resin is in a range of 4-9, the first auxiliary comprises one selected from the group consisting of an organosilicon wetting agent, a polyacrylate wetting leveling agent and a polyester wetting leveling agent, the second auxiliary comprises an alkynediol wetting agent, the third auxiliary comprises an epoxy phosphate ester adhesion promoter or a silane coupling agent adhesion promoter, and the diluent comprises one selected from the group consisting of pure water, distilled water and deionized water;

wherein the water-based coil coating meets the following conditions: viscosity: 80-120 s in a Ford cup #4, the solid content >40 wt. %, a PMT: 210-232° C., T-bend: 0-2 T, MEK wiping >100 times, gloss at 60 degrees >85%, boiling water resistance >2 h.

3. A water-based coil coating without amine neutralization, wherein the water-based coil coating does not comprise amine neutralizing agents and does not use raw materials with heavy metal organic catalysts comprising organotin, and the water-based coil coating comprises the following components in percent by weight:

an amine-free waterborne resin: 80-84.2%;
a crosslinking resin: 3.8-8.0%;
a first auxiliary: 0.35%;
a second auxiliary: 0.35%;
a third auxiliary: 1.7%;
and
a diluent; wherein a solid content in the water-based coil coating is greater than 40%, a solid content ratio of the amine-free waterborne resin to the crosslinking resin is in a range of 4-9, the first auxiliary comprises one selected from the group consisting of an organosilicon wetting agent, a polyacrylate wetting leveling agent and a polyester wetting leveling agent, the second auxiliary comprises an alkynediol wetting agent, the third auxiliary comprises an epoxy phosphate ester adhesion promoter or a silane coupling agent adhesion promoter, and the diluent comprises one selected from the group consisting of pure water, distilled water and deionized water;

wherein the water-based coil coating meets the following conditions: viscosity: 80-120 s in a Ford cup #4, the solid content >40 wt. %, a PMT: 210-232° C., T-bend: 0-2 T, MEK wiping >100 times, gloss at 60 degrees >85%, boiling water resistance >2 h.

4. The water-based coil coating without amine neutralization as claimed in claim 1, wherein the amine-free waterborne resin is obtained by a reaction of polyester polyol and acrylate oligomer containing carboxyl, the polyester polyol comprises methylpropanediol ($C_4H_{10}O_2$), hydroxypivalic acid ($C_5H_{10}O_3$), neopentyl glycol monoester, trimellitic anhydride ($C_9H_4O_5$), 1,4-cyclohexanedicarboxylic acid ($C_8H_{12}O_4$), and adipic acid ($C_6H_{10}O_4$), and the acrylate oligomer comprises methyl methacrylate ($C_5H_8O_2$), methacrylic acid ($C_4H_6O_2$), acrylic acid ($C_3H_4O_2$), and butyl acrylate ($C_7H_{12}O_2$); and the crosslinking resin is a highly methylated, monomeric melamine crosslinker supplied in liquid form at ≥98% solids content.

5. The water-based coil coating without amine neutralization as claimed in claim 2, wherein the amine-free waterborne resin is obtained by a reaction of polyester polyol and acrylate oligomer containing carboxyl, the polyester polyol comprises methylpropanediol ($C_4H_{10}O_2$), hydroxypivalic acid ($C_5H_{10}O_3$), neopentyl glycol monoester, trimellitic anhydride ($C_9H_4O_5$), 1,4-cyclohexanedicarboxylic acid ($C_8H_{12}O_4$), and adipic acid ($C_6H_{10}O_4$), and the acrylate oligomer comprises methyl methacrylate ($C_5H_8O_2$), methacrylic acid ($C_4H_6O_2$), acrylic acid ($C_3H_4O_2$), and butyl acrylate ($C_7H_{12}O_2$);

the crosslinking resin is a highly methylated, monomeric melamine crosslinker supplied in liquid form at ≥98% solids content; and the water-based coil coating comprises 40% of white paste in percent by weight, and the white paste is pigment white 6.

6. The water-based coil coating without amine neutralization as claimed in claim 3, wherein the amine-free waterborne resin is obtained by a reaction of polyester polyol and acrylate oligomer containing carboxyl, the polyester polyol comprises methylpropanediol ($C_4H_{10}O_2$), hydroxypivalic acid ($C_5H_{10}O_3$), neopentyl glycol monoester, trimellitic anhydride ($C_9H_4O_5$), 1,4-cyclohexanedicarboxylic acid ($C_8H_{12}O_4$), and adipic acid ($C_6H_{10}O_4$), and the acrylate oligomer comprises methyl methacrylate ($C_5H_8O_2$), methacrylic acid ($C_4H_6O_2$), acrylic acid ($C_3H_4O_2$), and butyl acrylate ($C_7H_{12}O_2$);

the crosslinking resin is a highly methylated, monomeric melamine crosslinker supplied in liquid form at ≥98% solids content; and the water-based coil coating comprises 9.6% of black paste in percent by weight, and the black paste is pigment black 7.

* * * * *